(12) United States Patent
Krompegel et al.

(10) Patent No.: US 11,339,898 B2
(45) Date of Patent: May 24, 2022

(54) MODULAR RETAINER ASSEMBLY

(71) Applicant: Aptiv Technologies Limited, St. Michael (BB)

(72) Inventors: Sean P. Krompegel, Canfield, OH (US); David A. Myers, Hubbard, OH (US); Jeffrey M. Handel, Canfield, OH (US)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 17/121,483

(22) Filed: Dec. 14, 2020

(65) Prior Publication Data

US 2021/0095789 A1 Apr. 1, 2021

Related U.S. Application Data

(62) Division of application No. 16/397,417, filed on Apr. 29, 2019, now Pat. No. 10,907,750.

(51) Int. Cl.

| F16L 3/06 | (2006.01) |
|---|---|
| F16G 11/10 | (2006.01) |
| F16L 3/12 | (2006.01) |
| F16L 3/10 | (2006.01) |
| F16L 3/22 | (2006.01) |
| F16L 3/04 | (2006.01) |

(52) U.S. Cl.
CPC ............... *F16L 3/06* (2013.01); *F16G 11/10* (2013.01); *F16L 3/04* (2013.01); *F16L 3/1033* (2013.01); *F16L 3/12* (2013.01); *F16L 3/221* (2013.01)

(58) Field of Classification Search
CPC ....... F16L 3/02; F16L 3/04; F16L 3/06; F16L 3/1033; F16L 3/1041; F16L 3/1233; F16L 3/221; F16L 3/222; F16L 3/22; F16L 3/12; H02G 3/32; F16G 11/10
See application file for complete search history.

(56) References Cited

U.S. PATENT DOCUMENTS

| 3,944,177 A | 3/1976 | Yoda |
| 4,029,277 A | 6/1977 | Bulanda |

(Continued)

FOREIGN PATENT DOCUMENTS

| CA | 2527013 A1 | 5/2006 |
| CN | 204905781 U | 12/2015 |

(Continued)

OTHER PUBLICATIONS

Chinese Office Action based off CN Application No. 202010348782.3, dated Apr. 6, 2021, 7 pages.

(Continued)

*Primary Examiner* — Eret C McNichols
(74) *Attorney, Agent, or Firm* — Billion & Armitage

(57) ABSTRACT

A modular retainer assembly is presented herein. The modular retainer assembly includes a first retainer module defining a flexible first retaining finger and a second retainer module that is distinct from and joined to the first retaining module. The second retainer module defines a flexible second retaining finger. When the first and second retainer modules are mated together, the first retaining finger is arranged opposite the second retaining finger. The first and second retaining fingers are configured to receive and retain an elongate article, such as a wire cable, between them.

22 Claims, 6 Drawing Sheets

(56) References Cited

U.S. PATENT DOCUMENTS

| | | | |
|---|---|---|---|
| 4,327,887 A | 5/1982 | Kumakura | |
| 4,431,152 A | 2/1984 | Reed | |
| 5,190,251 A | 3/1993 | Bodo | |
| 5,752,681 A * | 5/1998 | Janssen | F16L 3/04 248/65 |
| 5,884,372 A * | 3/1999 | Anscher | F16L 3/02 24/339 |
| 7,758,217 B2 | 7/2010 | Hsu | |
| 8,070,111 B1 | 12/2011 | Zeller | |
| 8,262,035 B2 | 9/2012 | Bieus | |
| 9,206,927 B2 | 12/2015 | Carter | |
| 9,698,529 B1 | 7/2017 | Schow | |
| 10,439,381 B1 * | 10/2019 | Mohlman | H02G 3/0406 |
| 10,690,267 B2 * | 6/2020 | Pisacreta | F16L 3/123 |
| 2001/0051072 A1 * | 12/2001 | Eckart | F16L 3/1033 403/344 |
| 2002/0179780 A1 | 12/2002 | Benoit | |
| 2007/0128939 A1 * | 6/2007 | Low | H02G 3/30 439/607.41 |
| 2007/0297743 A1 | 12/2007 | Rapp et al. | |
| 2010/0258684 A1 | 10/2010 | Marquis-Martin | |
| 2010/0258685 A1 | 10/2010 | Garner | |
| 2012/0037765 A1 * | 2/2012 | Guthke | F16L 3/1041 248/67.5 |
| 2013/0048826 A1 * | 2/2013 | Go | F16L 55/035 248/560 |
| 2017/0219126 A1 | 8/2017 | Kato | |
| 2017/0284592 A1 | 10/2017 | Stender | |
| 2018/0205213 A1 * | 7/2018 | Varale | H02G 3/30 |
| 2019/0379188 A1 | 12/2019 | Brouwer | |

FOREIGN PATENT DOCUMENTS

| | | | | |
|---|---|---|---|---|
| CN | 208112127 U | | 11/2018 | |
| DE | 509529 C | * | 10/1930 | ............ F16L 3/1033 |
| DE | 1167607 B | * | 4/1964 | ............... F16L 3/10 |
| DE | 202004013412.8 U1 | | 10/2004 | |
| DE | 102005025679 A1 | | 12/2006 | |
| DE | 202017107545 U1 | | 3/2019 | |
| EP | 2105642 A1 | | 9/2009 | |
| FR | 1250380 A | * | 1/1961 | ............ F16B 37/045 |
| FR | 2820189 A1 | * | 8/2002 | ............ F16L 3/1041 |
| FR | 2885670 A1 | | 11/2006 | |
| FR | 2964712 A1 | | 3/2012 | |
| FR | 3006412 A1 | | 12/2014 | |
| GB | 303990 A | * | 1/1929 | ............ F16L 3/1033 |
| GB | 952164 A | * | 3/1964 | ............. F16L 3/221 |
| GB | 959109 A | * | 5/1964 | ............. F16L 3/221 |
| GB | 1468823 A | * | 3/1977 | ............ F16L 3/1041 |
| JP | 6000855 Y2 | | 1/1994 | |
| KR | 20020085709 A | | 11/2002 | |
| KR | 100388855 B1 | | 6/2003 | |

OTHER PUBLICATIONS

Quick Build Wire End Holder Drawing, Panduit Corp., Oct. 20, 2016.
WEH-E8-* Drawing, Panduit Corp., Nov. 5, 2018.
"Bracket Blind Hole Series,", Online Katalog der Firma Richco Inc, Katalogummer OFB-BH-6-19 O.F. Internet Citation,, Nov. 14, 2005, 102.
Extended European Search Report for EP Application No. 201702767. 7, dated Sep. 22, 2020, 9 pages.

* cited by examiner

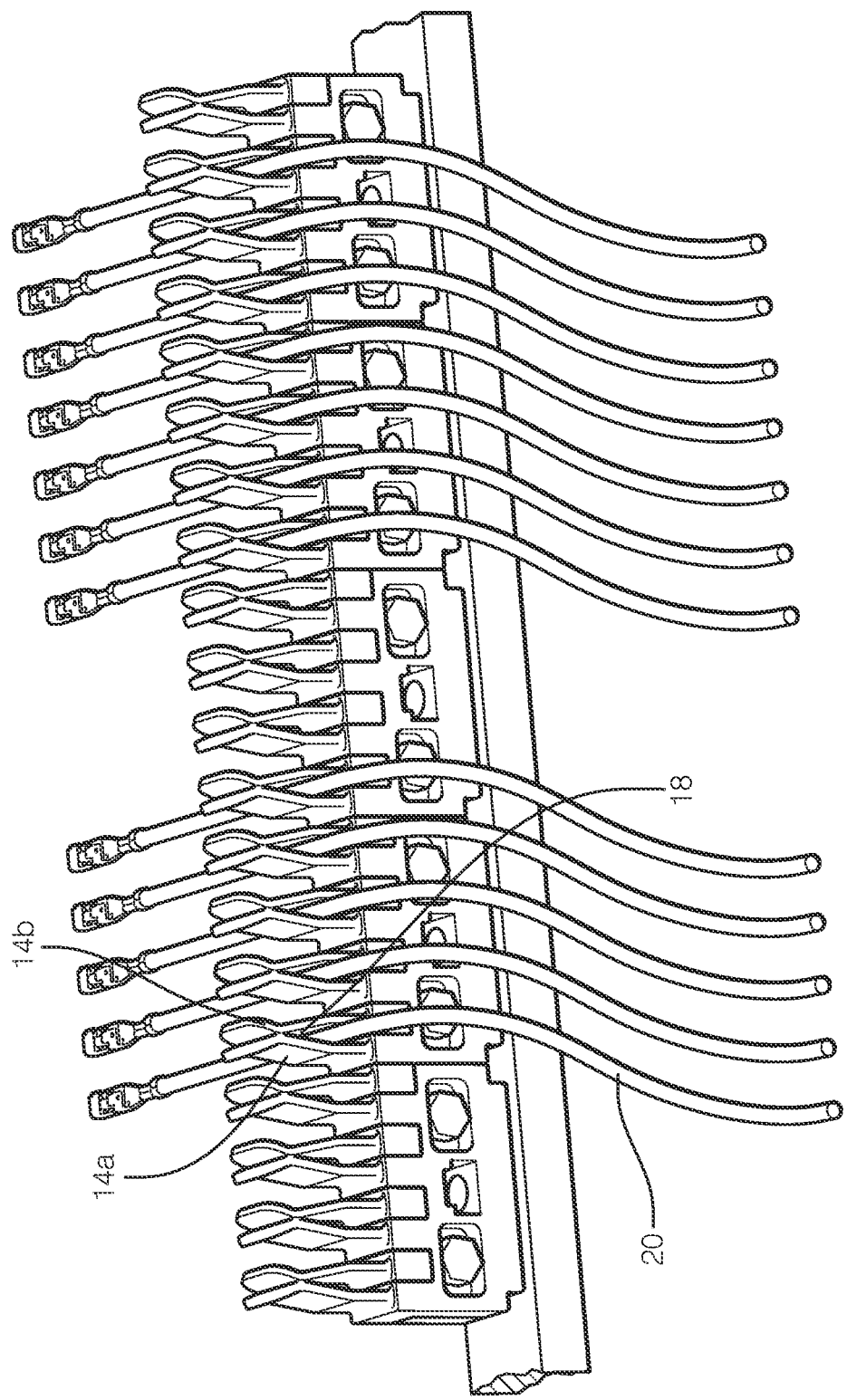

MODULAR RETAINER ASSEMBLY

CROSS-REFERENCE TO RELATED APPLICATION

This application is a divisional application and claims the benefit of co-pending U.S. patent application Ser. No. 16/397,417 filed Aug. 28, 2019, the entire disclosure of which is hereby incorporated by reference.

TECHNICAL FIELD

The invention generally relates to a modular retainer assembly configured to retain an elongate article, such as an electrical cable.

BRIEF SUMMARY

According to one implementation of the invention, a modular retainer assembly is provided. The modular retainer assembly includes a first retainer module defining a flexible first retaining finger and a second retainer module that is distinct from and joined to the first retaining module. The second retainer module defines a flexible second retaining finger. When the first and second retainer modules are mated together, the first retaining finger is arranged opposite the second retaining finger. The first and second retaining fingers are configured to receive and retain an elongate article between them.

An example implementation having one or more features of the modular retainer assembly of the previous paragraph further includes a fastening device configured to secure the first retainer module to the second retainer module.

In an example implementation having one or more features of the modular retainer assembly of the previous paragraph, the fastening device is further configured to release the first retainer module from to the second retainer module.

In an example implementation having one or more features of the modular retainer assembly of the previous paragraph, the first retainer module is substantially dimensionally indistinguishable from the second retainer module.

In an example implementation having one or more features of the modular retainer assembly of the previous paragraph, the first retainer module is dimensionally identical to the second retainer module.

In an example implementation having one or more features of the modular retainer assembly of the previous paragraph, the first and second retainer modules are formed of a polymeric material using a molding process and the first retainer module may be formed form the same mold cavity as the second retainer module.

In an example implementation having one or more features of the modular retainer assembly of the previous paragraph, the elongate article is a wire cable.

According to another implementation of the invention, a retainer module is provided. The retainer module includes a base portion and a flexible finger portion extending from the base portion having a first arcuate section located proximate the base portion and a second arcuate section curving in a direction opposite the first arcuate section. The second arcuate section is located proximate a tip of the finger portion. The retainer module also includes an attachment portion extending from the base portion in a direction opposite the finger portion. The attachment portion has an inner surface and an outer surface opposite the inner surface. A thickness of the attachment portion is less than a thickness of the base portion.

An example implementation having one or more features of the retainer module of the previous paragraph further includes a plurality of the base portions and a plurality of the finger portions.

In an example implementation having one or more features of the retainer module of the previous paragraph, the thickness of the attachment portion is about half of the thickness of the base portion.

In an example implementation having one or more features of the retainer module of the previous paragraph, the retainer module is formed of a polymeric material.

In an example implementation having one or more features of the retainer module of the previous paragraph, a radius of curvature of the first arcuate section is greater than a radius of curvature of the second arcuate section.

In an example implementation having one or more features of the retainer module of the previous paragraph, the base portion overhangs the inner surface of the attachment portion.

In an example implementation having one or more features of the retainer module of the previous paragraph, the attachment portion defines a first aperture and a second aperture, each extending therethrough from the inner surface to the outer surface. The first aperture and the second aperture are equidistant from a centerline of the attachment portion.

In an example implementation having one or more features of the retainer module of the previous paragraph, the inner surface defines a first alignment feature protruding from the inner surface and a second alignment feature indented into the inner surface. The first alignment feature and the second alignment feature are equidistant from the centerline of the attachment portion.

In an example implementation having one or more features of the retainer module of the previous paragraph, the first alignment feature has a different cross-sectional shape than the second alignment feature.

In an example implementation having one or more features of the retainer module of the previous paragraph, the outer surface defines a first countersunk area surrounding the first aperture and a second countersunk area surrounding the second aperture.

According to yet another implementation of the invention, a modular retainer assembly is provided. The modular retainer assembly includes a first retainer module having one or more features of the retainer module of the previous paragraph and a second retainer module having one or more features of the retainer module of the previous paragraph. The first alignment feature of the first retainer module is received within the second alignment feature of the second retainer module and the first alignment feature of the second retainer module is received within the second alignment feature of the first retainer module.

An example implementation having one or more features of the modular retainer assembly of the previous paragraph further includes a first fastening device disposed in the first aperture and a second fastening device disposed in the second aperture, each in compressive contact with the outer surfaces of the first and second retainer modules, thereby securing the first retainer module to the second retainer module.

In an example implementation having one or more features of the modular retainer assembly of the previous paragraph, the first and second fastening devices are treaded fasteners having a screw with a head and a nut. The heads and the nuts are contained within the first or second countersunk areas.

In an example implementation having one or more features of the modular retainer assembly of the previous paragraph, the first retainer module is substantially dimensionally indistinguishable the second retainer module.

According to one more implementation of the invention, a method of retaining an elongate article is provided. The method includes the step of providing a first retainer module and a second retainer module, the first and second retainer modules each having a base portion, a flexible finger portion extending from the base portion having a first arcuate section proximate the base portion and a second arcuate section curving in a direction opposite the first arcuate section proximate a tip of the finger portion, and an attachment portion extending from the base portion in a direction opposite the finger portion, wherein the attachment portion has an inner surface and an outer surface opposite the inner surface and wherein a thickness of the attachment portion is less than a thickness of the base portion. The method further includes the step of securing the first retainer module to the second retainer module such that the inner surface of the first retainer module is in contact with the inner surface of the second retainer module.

An example implementation having one or more features of the method of the previous paragraph further includes the step of disposing the elongate article between the finger portions of the first and second retainer modules.

In an example implementation having one or more features of the method of the previous paragraph, the elongate article is a wire cable.

BRIEF DESCRIPTION OF THE DRAWINGS

The present invention will now be described, by way of example with reference to the accompanying drawings, in which:

FIG. 4 is a wiring transport pallet in which wire cables are retaining by the modular retainer assembly of FIG. 1 according to one implementation of the invention.

DETAILED DESCRIPTION

Reference will now be made in detail to implementations, examples of which are illustrated in the accompanying drawings. In the following detailed description, numerous specific details are set forth to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
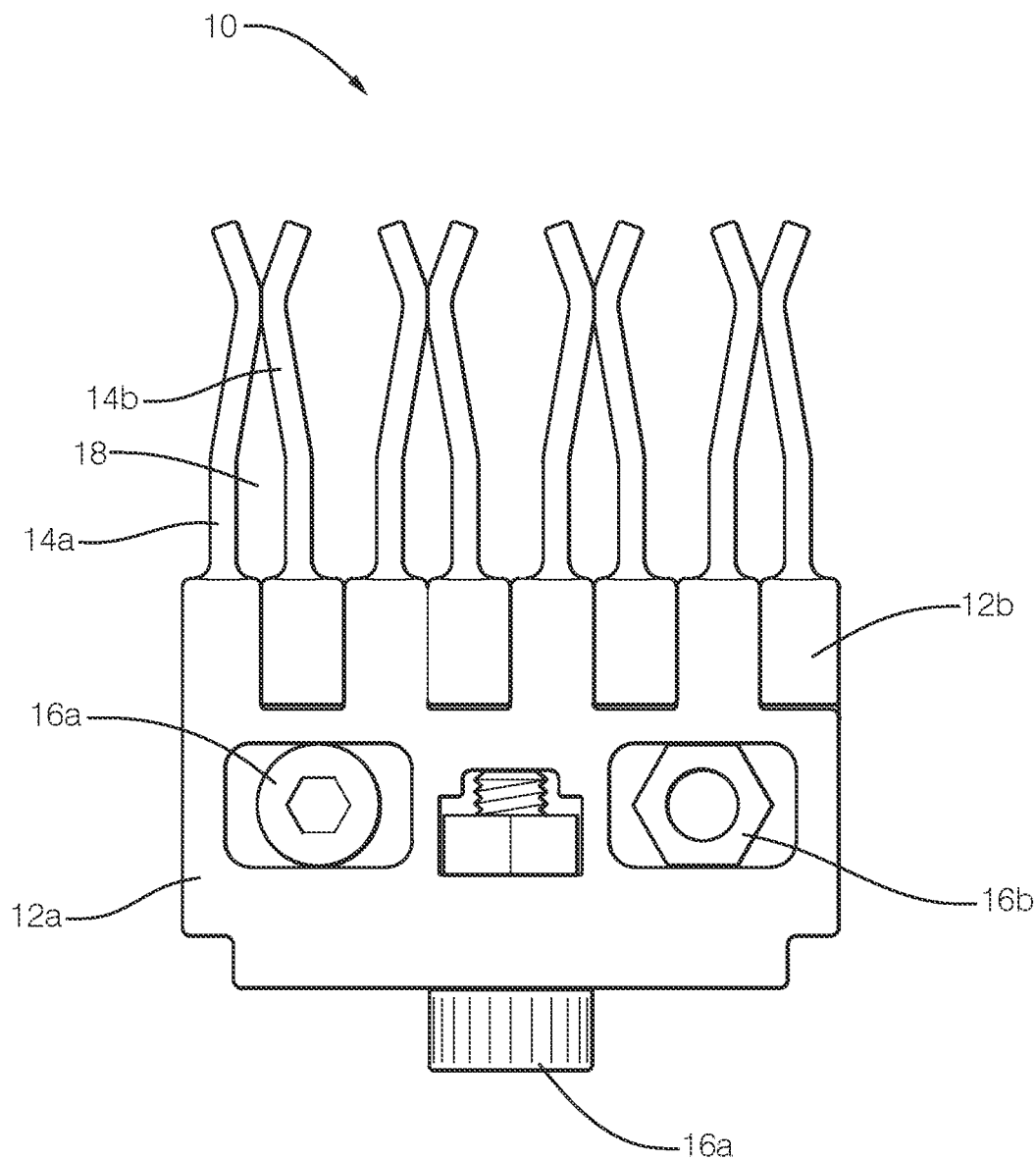
FIG. 1 is a perspective view of a modular retainer assembly according to one implementation of the invention.
Figure 2:
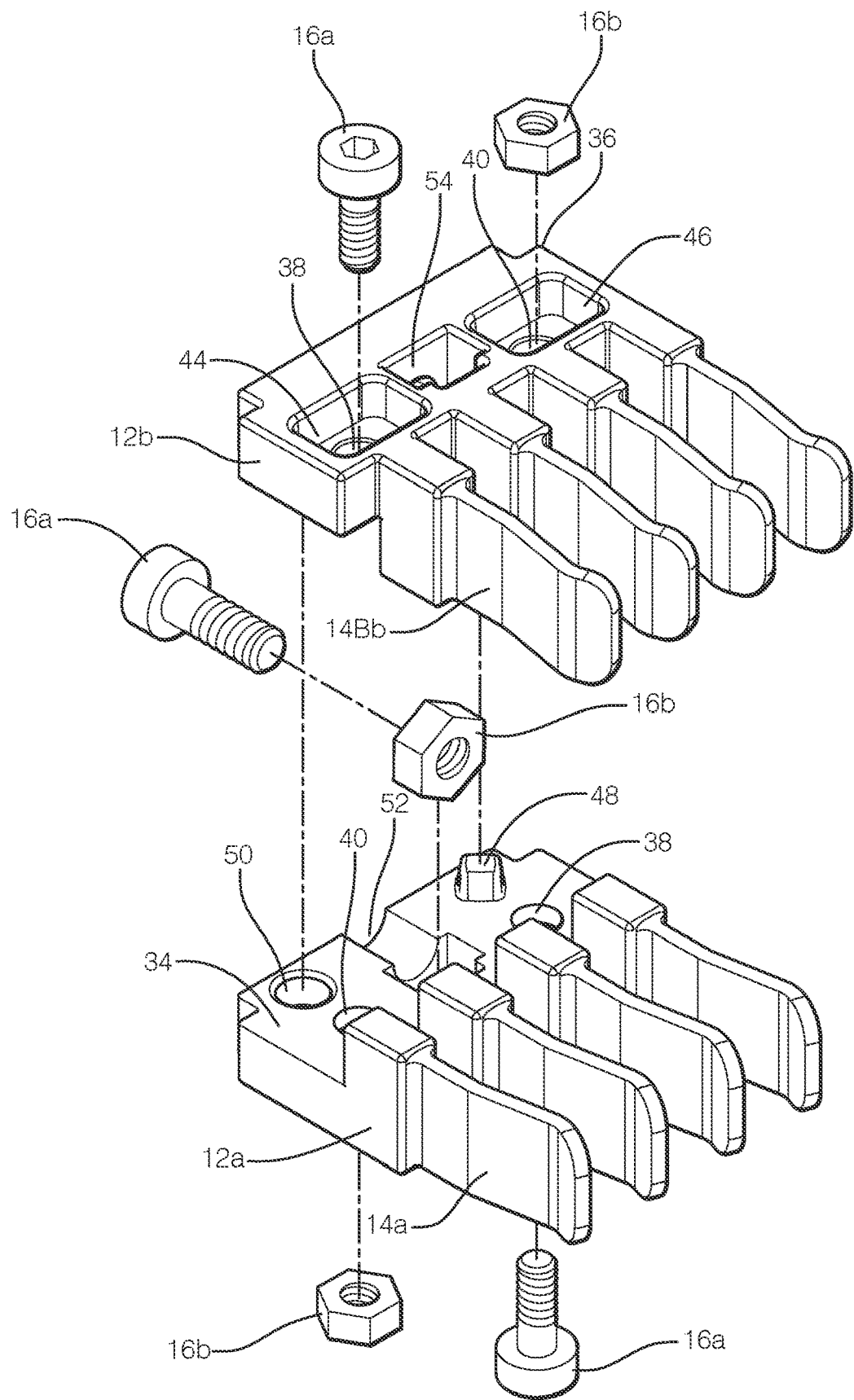
FIG. 2 is an exploded perspective view of the modular retainer assembly of FIG. 1 according to one implementation of the invention.
Figure 3:
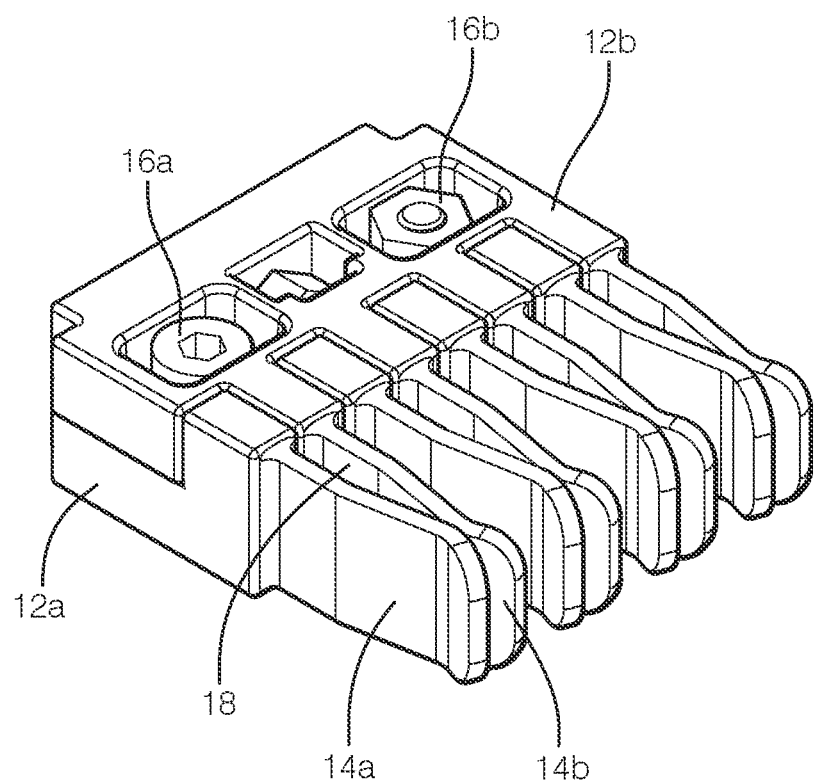
FIG. 3 is a perspective view of the modular retainer assembly of FIG. 1 according to one implementation of the invention.

FIGS. 1-3 illustrate a non-limiting example of a modular retainer assembly 10 according to one or more implementations of the invention. The modular retainer assembly 10 includes a first retainer module 12a and a second retainer module 12b that is separate and distinct from the first retainer module 12a. The first retainer module 12a defines a flexible first retaining finger 14a and the second retainer module 12b defines a flexible second retaining finger 14b. The second retainer module 12b is joined and secured to the first retaining module 12a by a releasable fastening device, e.g. a pair of socket head screws 16a and hex nuts 16b. As the first and second retainer modules 12a, 12b are joined or mated together, the first retaining finger 14a is arranged so that it is located opposite the second retaining finger 14b, thereby forming a retaining channel 18 between them. The first and second retaining fingers 14a, 14b are configured to receive and releasably retain an elongate article 20, such as a wire cable, within the retaining channel 18 as illustrated in FIG. 4. The first and second retaining fingers 14a, 14b have rounded corners and edges to minimize the likelihood of damage to the elongate element 20 as it is inserted into and removed from the retaining channel 18.

In alternative implementations, other releasable fasteners, such as cam fasteners may be used to secure the first and second retainer modules to one another. In yet other alternative implementations, a non-releasable fastening device such as an adhesive or rivet may be used to secure the first and second retainer modules to one another.

The first retainer module 12a is the same as the second retainer module 12b. i.e. they may be substantially dimensionally indistinguishable from one another. As used herein "substantially dimensionally indistinguishable" means that the dimensions of the first and second retainer modules 12a, 12b are the same within the manufacturing tolerances of the process used to manufacture the retainer modules when using the same manufacturing process. The first retainer module 12a may alternatively be dimensionally identical to the second retainer module 12b. As used herein "dimensionally identical" means that the dimensions of the first and second retainer modules 12a, 12b are identical within the manufacturing tolerances of the process used to manufacture the retainer modules when using the same tooling.

In one implementation, the first and second retainer modules 12a, 12b are formed from a polymeric material, such as a glass filled polyamide (nylon) material, using a molding process and the first retainer module 12a in formed in the same mold cavity as the second retainer module 12b, thereby providing a first retainer module 12a that is dimensionally identical to the second retainer module 12b.

Figure 5C:
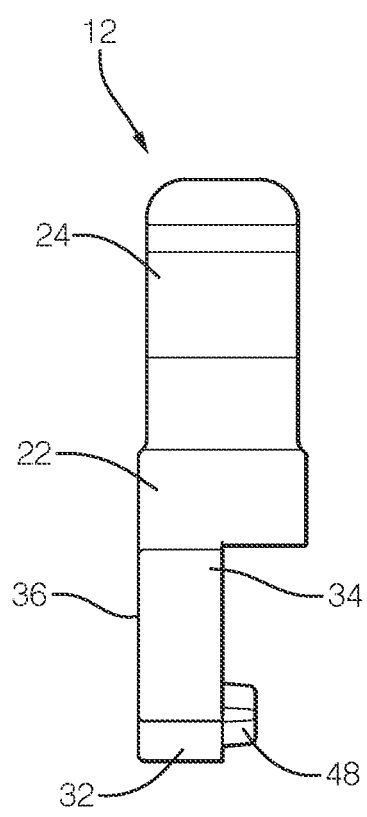
FIG. 5C is a side view of the retainer module of FIG. 5A according to one implementation of the invention.
Figure 5A:
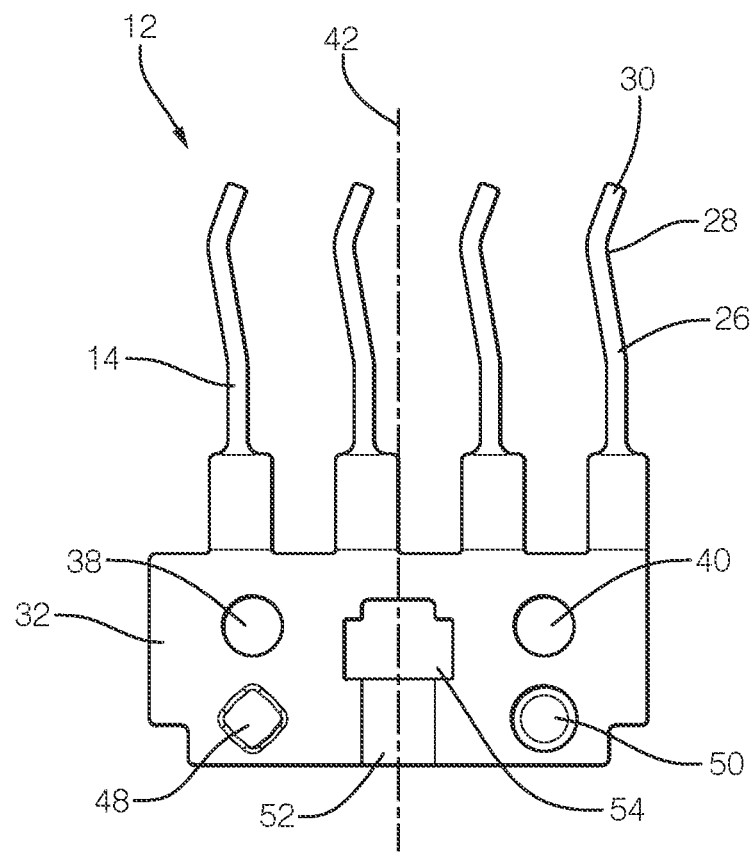
FIG. 5A is a front view of a retainer module of the modular retainer assembly of FIG. 1 according to one implementation of the invention.
Figure 5B:
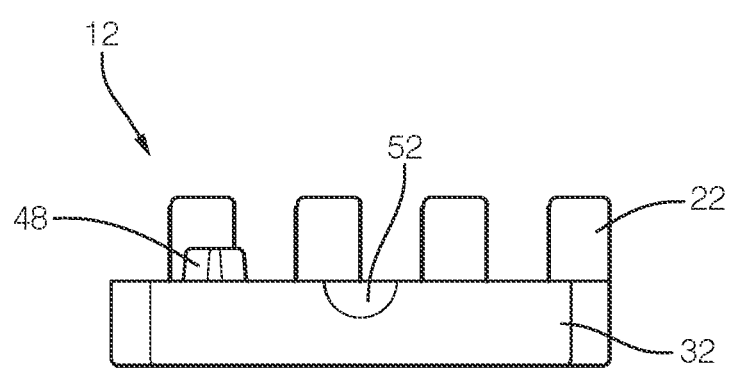
FIG. 5B is a bottom view of the retainer module of FIG. 5A according to one implementation of the invention.

A non-limiting example of a retainer module 12 is illustrated in FIGS. 5A-5C. Each retainer module 12 includes a retaining finger 14 having a base portion 22 and a flexible finger portion 24 extending from the base portion 22. The finger portion 24 has a first arcuate section 26 located proximate the base portion 22 and a second arcuate section 28 curving in a direction opposite the first arcuate section 26. The second arcuate section 28 is located proximate a tip 30 of the finger portion 24. A radius of curvature of the first arcuate section 26 is greater than a radius of curvature of the second arcuate section 28.

The retainer module 12 also includes an attachment portion 32 extending from the base portion 22 in a direction opposite the finger portion 24. The attachment portion 32 has an inner surface 34 and an outer surface 36 opposite the inner surface 34. A thickness of the attachment portion 32 is less than a thickness of the base portion 22. According to this example implementation, the thickness of the attachment portion 32 is about half of the thickness of the base portion 22. Further according to this example implementation, the retainer module 12 includes a plurality of the base portions and a plurality of the finger portions. The base portion 22 overhangs the inner surface 34 of the attachment portion 32.

The attachment portion 32 defines a first aperture 38 and a second aperture 40, each extending therethrough from the inner surface 34 to the outer surface 36. The first aperture 38 and the second aperture 40 are equidistant from a centerline 42 of the attachment portion 32, thereby allowing the retainer module 12 to be used as a first retainer module 12a or a second retainer module 12b in the modular retainer assembly 10. The outer surface 36 defines a first countersunk area 44 surrounding the first aperture 38 and a second countersunk area 46 surrounding the second aperture 40 in which the head of the socket head screw 16a or hex nut 16b is received. The first and second apertures 38, 40 are sized to inhibit rotation of the hex nut 16b when the socket head screw 16a is turned to tighten or loosen the screw 16a.

The inner surface 34 defines a first alignment feature 48 protruding from the inner surface 34 and a second alignment feature 50 indented into the inner surface 34. The first alignment feature 48 and the second alignment feature 50 are equidistant from the centerline 42 of the attachment portion 32, thereby allowing the retainer module 12 to be used as a first retainer module 12a or a second retainer module 12b in the modular retainer assembly 10. As the first retainer module 12a is mated with the second retainer module 12b, the first alignment feature 48 of the first retainer module 12a is received within the second alignment feature 50 of the second retainer module 12b and the first alignment feature 48 of the second retainer module 12b is received within the second alignment feature 50 of the first retainer module 12a.

In the illustrated example implementation, the first alignment feature 48 has a different cross-sectional shape than the second alignment feature 50, i.e. round vs. diamond shape. The first alignment feature 48 is sized such that it may be received within the second alignment feature 50. In alternative embodiments, the first and second alignment features may have the same cross-sectional shape. In other alternative embodiments, the first and second alignment features of the first retainer module may have different shapes than the first and second alignment features of the second retainer module, however in this case the first and second retainer modules would not be interchangeable.

The retainer module 12 also defines a hemicylindrical channel 52 in the inner surface 34 extending to a rectangular aperture 54 extending through the attachment portion 32 from the inner surface 34 to the outer surface 36. When the first retainer module 12a is mated with the second retainer module 12b, the hemicylindrical channels 52 form a cylindrical passage in which another fastener may be received to attach the modular retainer assembly 10 to a support structure as shown in FIG. 4. As shown in the example of FIG. 1, another screw 16a is inserted within the passage and a hex nut 16b is disposed within the aperture. The aperture is sized to inhibit rotation of the hex nut 16b when the screw 16a is turned to tighten or loosen the screw 16a.

The modular retainer assembly 10 may be used to retain wire cables 20 in a wire transport pallet as shown in FIG. 4. Such a wire transport pallet may be used while manufacturing wire harness assemblies to move wires between machines that apply terminals to the ends of the wire cables and machines that insert the terminals into electrical connector housings.

While the illustrated examples are configured to secure a wire cable, alternative implementations may be used to secure other elongate articles such as hydraulic hoses, pneumatic tubing, fiber optic cables, conduits, vines, harnesses, etc., to a supporting structure.

Figure 6:
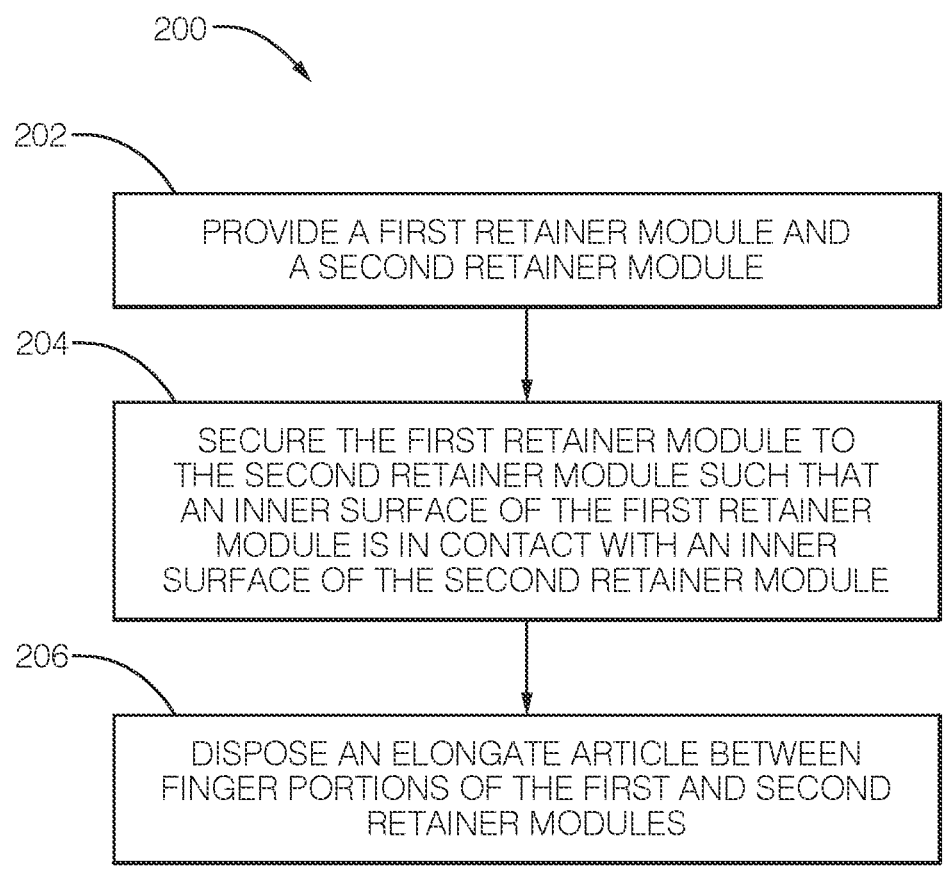
FIG. 6 is a flow chart of a method of retaining an elongate article according to another implementation of the invention.

FIG. 6 illustrates a method 200 of method 200 of retaining an elongate article 20. The method 200 includes the following steps:

STEP 202, PROVIDE A FIRST RETAINER MODULE AND A SECOND RETAINER MODULE, includes providing a first retainer module 12a and a second retainer module 12b, the first and second retainer modules 12a, 12b each having a base portion 22, a finger portion 24 extending from the base portion 22 having a first arcuate section 26 proximate the base portion 22 and a second arcuate section 28 curving in a direction opposite the first arcuate section 26 proximate a tip 30 of the finger portion 24, and an attachment portion 32 extending from the base portion 22 in a direction opposite the finger portion 24, wherein the attachment portion 32 has an inner surface 34 and an outer surface 36 opposite the inner surface 34 and wherein a thickness of the attachment portion 32 is less than a thickness of the base portion 22;

STEP 204, SECURE THE FIRST RETAINER MODULE TO THE SECOND RETAINER MODULE SUCH THAT AN INNER SURFACE OF THE FIRST RETAINER MODULE IS IN CONTACT WITH AN INNER SURFACE OF THE SECOND RETAINER MODULE, includes securing the first retainer module 12a to the second retainer module 12b such that the inner surface 34 of the first retainer module 12a is in contact with the inner surface 34 of the second retainer module 12b; and STEP 206, DISPOSE AN ELONGATE ARTICLE BETWEEN FINGER PORTIONS OF THE FIRST AND SECOND RETAINER MODULES, includes disposing the elongate article 20 between the finger portions of the first and second retainer modules 12a, 12b. In one example, the elongate article 20 is a wire cable.

Accordingly, a modular retainer assembly 10 and a retainer module 12 is presented. The modular terminal assembly provides the benefit of being service able allowing replacement of one of the retainer modules 12a, 12b if a retainer finger 14 is broken rather than replacing the entire modular retainer assembly 10. The retainer module 12 also provides the benefit of forming the modular retainer assembly 10 with as few as three separate parts, the retainer module 12, the screw, and the nut, thereby minimizing the part count for the assembly. The retainer module 12 also simplifies the tooling required to make the modular retainer assembly 10 because the retainer modules may be made from a single mold cavity design. Consistent shapes of the retaining fingers 14 and consistent spring forces provided by the retaining fingers 14 may be achieved with tight molding tolerances. The modular retainer assembly 10 will accommodate elongate articles 20 with a wide range of cross section areas, e.g. 0.75 $mm^2$ to 2.0 $mm^2$. The design of the retainer module 12 may be easily modified to adjust engagement and retention forces, if needed. A method 200 of retaining an elongate article 20 using the modular retainer assembly 10 is also presented.

While this invention has been described in terms of the preferred implementations thereof, it is not intended to be so limited, but rather only to the extent set forth in the claims that follow. For example, the above-described implementations (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain implementations and are by no means limiting and are merely prototypical implementations.

Many other implementations and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A modular retainer assembly, comprising:
   a first retainer module having a flexible first retaining finger and a first base portion from which the first retaining finger extends; and
   a second retainer module distinct from and joined to the first retaining module, said second retainer module having a flexible second retaining finger and a second base portion from which the second retaining finger extends, wherein the first and second retaining fingers each have a concave first arcuate section located proximate the first or second base portion and a convex second arcuate section arranged located proximate a tip of the first or second retaining finger, wherein the first retaining finger is arranged opposite the second retaining finger when the first and second retainer modules are mated together, and wherein the first and second retaining fingers are configured to receive and retain an elongate article between them.

2. The modular retainer assembly according to claim 1, further comprising:
   a fastening device configured to secure the first retainer module to the second retainer module.

3. The modular retainer assembly according to claim 2, wherein the fastening device is further configured to release the first retainer module from the second retainer module.

4. The modular retainer assembly according to claim 1, wherein the first retainer module is substantially dimensionally indistinguishable from the second retainer module.

5. The modular retainer assembly according to claim 4, wherein the first retainer module is dimensionally identical to the second retainer module.

6. The modular retainer assembly according to claim 1, wherein the first and second retainer modules are formed of a polymeric material using a molding process and wherein the first retainer module may be formed from the same mold cavity as the second retainer module.

7. The modular retainer assembly according to claim 1, wherein the elongate article is a wire cable.

8. The modular retainer assembly according to claim 1, wherein the first base portion is integrally formed with the first retaining finger and the second base portion is integrally formed with the second retaining finger.

9. The modular retainer assembly according to claim 1, wherein the first base portion is formed of the same material as the first retaining finger and the second base portion is formed of the same material as the second retaining finger.

10. The modular retainer assembly according to claim 1, wherein the first base portion includes a first attachment portion extending from the first base portion in a direction opposite the first retaining finger and the second base portion includes a second attachment portion extending from the second base portion in a direction opposite the second retaining finger.

11. The modular retainer assembly according to claim 10, wherein a thickness of the first attachment portion is less than a thickness of the first base portion and wherein a thickness of the second attachment portion is less than a thickness of the second base portion.

12. The modular retainer assembly according to claim 10, wherein the first and second attachment portions each have an inner surface and an outer surface opposite the inner surface.

13. The modular retainer assembly according to claim 10, wherein the first and second attachment portions each have first alignment feature protruding from the inner surface and a second alignment feature indented into the inner surface and wherein the first and second alignment features are sized, shaped, and arranged such that the first alignment features are received within the second alignment features when the first and second retainer modules are mated together.

14. The modular retainer assembly according to claim 13, wherein the first and second alignment features are equidistant from a centerline of the first or second attachment portion.

15. The modular retainer assembly according to claim 10, wherein the first and second attachment portions each define a first aperture and a second aperture extending from the inner surface to the outer surface and wherein the first and second alignment features are sized, shaped, and arranged such that the first aperture of the first attachment portion is aligned with the second aperture of the second attachment portion when the first and second retainer modules are mated together.

16. The modular retainer assembly according to claim 15, wherein the first and second alignment features are sized, shaped, and arranged such that the second aperture of the first attachment portion is aligned with the first aperture of the second attachment portion when the first and second retainer modules are mated together.

17. The modular retainer assembly according to claim 15, wherein the outer surfaces of the first and second attachment portions each define a first countersunk area surrounding the first aperture and a second countersunk area surrounding the second aperture.

18. The modular retainer assembly according to claim 15, wherein the first and second apertures and the second aperture are equidistant from a centerline of the first or second attachment portion.

19. A modular retainer assembly, comprising:
a first retainer module defining a flexible first retaining finger; and
a second retainer module distinct from and joined to the first retaining module, said second retainer module defining a flexible second retaining finger, wherein, when the first and second retainer modules are mated together, the first retaining finger is arranged opposite the second retaining finger and wherein the first and second retaining fingers are configured to receive and retain an elongate article between them, wherein the first retainer module has a first base portion from which the first retaining finger extends and the second retainer module has a second base portion from which the second retaining finger extends, wherein the first base portion includes a first attachment portion extending from the first base portion in a direction opposite the first retaining finger and the second base portion includes a second attachment portion extending from the second base portion in a direction opposite the second retaining finger, wherein the first and second attachment portions each define a first aperture and a second aperture extending from the inner surface to the outer surface, and wherein the first and second alignment features are sized, shaped, and arranged such that the first aperture of the first attachment portion is aligned with the second aperture of the second attachment portion when the first and second retainer modules are mated together.

20. The modular retainer assembly according to claim 19, wherein the first and second alignment features are sized, shaped, and arranged such that the second aperture of the first attachment portion is aligned with the first aperture of the second attachment portion when the first and second retainer modules are mated together.

21. The modular retainer assembly according to claim 19, wherein the outer surfaces of the first and second attachment portions each define a first countersunk area surrounding the first aperture and a second countersunk area surrounding the second aperture.

22. The modular retainer assembly according to claim 19, wherein the first and second apertures and the second aperture are equidistant from a centerline of the first or second attachment portion.

* * * * *